(12) United States Patent
Ho et al.

(10) Patent No.: US 10,287,396 B2
(45) Date of Patent: May 14, 2019

(54) POLYMER

(71) Applicant: INDUSTRIAL TECHNOLOGY RESEARCH INSTITUTE, Hsinchu (TW)

(72) Inventors: Po-Hsien Ho, Taipei (TW); Chih-Hsiang Lin, Taipei (TW); Meng-Hsin Chen, Xinpi Township (TW); Cheng-Hsing Fan, Tainan (TW); Hsin-Ching Kao, Baoshan Township (TW); Yih-Her Chang, Baoshan Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 15/393,913

(22) Filed: Dec. 29, 2016

(65) Prior Publication Data
US 2017/0198098 A1 Jul. 13, 2017

Related U.S. Application Data

(60) Provisional application No. 62/277,091, filed on Jan. 11, 2016.

(30) Foreign Application Priority Data

Dec. 23, 2016 (TW) .............................. 105142916 A

(51) Int. Cl.
C08G 75/025 (2016.01)
C08G 75/029 (2016.01)
C08G 75/0227 (2016.01)

(52) U.S. Cl.
CPC ....... *C08G 75/0227* (2013.01); *C08G 75/025* (2013.01); *C08G 75/029* (2013.01); *Y02P 20/582* (2015.11)

(58) Field of Classification Search
CPC .... C07F 7/0801; C07F 7/0832; C07F 7/0827; C08G 75/00; C07B 51/00; C07D 209/12
See application file for complete search history.

(56) References Cited

U.S. PATENT DOCUMENTS

| | | | |
|---|---|---|---|
| 2,739,991 A | 3/1956 | Hervert | |
| 2,843,643 A | 7/1958 | Gleim | |
| 3,354,129 A | 11/1967 | Edmonds, Jr. et al. | |
| 3,987,016 A * | 10/1976 | Haddad | C08G 75/04 525/537 |
| 4,124,646 A | 11/1978 | Kawamura et al. | |
| 4,786,713 A | 11/1988 | Rule et al. | |
| 5,618,981 A | 4/1997 | Shaw | |
| 6,111,143 A | 8/2000 | Park et al. | |
| 6,215,021 B1 | 4/2001 | Shreeve et al. | |
| 8,445,629 B2 | 5/2013 | Hinokimori et al. | |
| 8,492,502 B2 | 7/2013 | Lee et al. | |
| 8,759,478 B2 | 6/2014 | Shin et al. | |
| 8,957,182 B2 | 2/2015 | Lee et al. | |
| 2004/0013926 A1 | 1/2004 | Akita et al. | |
| 2014/0128568 A1 | 5/2014 | Hinokimori | |
| 2016/0200874 A1 | 7/2016 | Watanabe et al. | |

FOREIGN PATENT DOCUMENTS

| | | | |
|---|---|---|---|
| CN | 1243122 A | 2/2000 | |
| CN | 1209349 C | 7/2005 | |
| CN | 100999445 A | 7/2007 | |
| CN | 101578321 A | 11/2009 | |
| CN | 100567371 C | 12/2009 | |
| EP | 3034542 A1 | 6/2016 | |
| EP | 3042924 A1 | 7/2016 | |
| JP | 50-29511 A | 3/1975 | |
| JP | 1-78993 U | 5/1989 | |
| JP | 5-178993 A | 7/1993 | |
| JP | 5-239213 A | 9/1993 | |
| JP | 7-278099 A | 10/1995 | |

(Continued)

OTHER PUBLICATIONS

Japanese Office Action for Appl. No. 2017-001902 dated Nov. 7, 2017 (w/ English translation).
Extended European Search Report, dated Mar. 28, 2017, for European Application No. 17150910.2.
Gabler et al., "Neue Polyphenylensulfone Reaktionen an Festers Polymeren," Chimia International Journal for Chemistry, vol. 28, No. 9, Sep. 1974, pp. 567-574, with an English abstract.
Hartke et al., "Reaction of Thioanisol with Antimony Pentachloride," Arch. Pharm., vol. 315, No. 2, 1982, pp. 153-156, with an English abstract.
Jilek et al., "Potential metabolites of the neuroleptic agents belonging to the 8-methylthio-10-piperazino-10,11-dihydrodiberizo[b,f]thiepin series; Synthesis of 2-hydroxy and 3-hydroxy derivatives," Collect. Czech. Chem. Commun., vol. 50, No. 10, 1985, pp. 2179-2190.

(Continued)

*Primary Examiner* — Shane Fang
(74) *Attorney, Agent, or Firm* — Birch, Stewart, Kolasch & Birch, LLP

(57) ABSTRACT

A polymer is provided. The polymer has a repeating unit having a structure represented by Formula (I) or Formula (II)

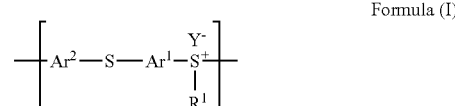

Formula (I)

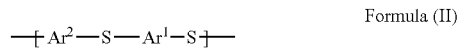

Formula (II)

wherein $Ar^1$ and $Ar^2$ can be substituted or unsubstituted aryl diradical; $Y^-$ can be $R^2SO_3^-$ or $ClO_4^-$; $R^1$ can be $C_{1-6}$ alkyl; $Ar^1$ and $Ar^2$ are different; and, $R^2$ can be $C_{1-6}$ alkyl, substituted or unsubstituted aromatic ring, or $C_{1-6}$ haloalkyl.

4 Claims, No Drawings

(56) References Cited

FOREIGN PATENT DOCUMENTS

| | | | |
|---|---|---|---|
| JP | 7-304872 A | 11/1995 |
| JP | 9-48854 A | 2/1997 |
| JP | 10-182823 A | 7/1998 |
| JP | 10-182825 A | 7/1998 |
| JP | 298827 B2 | 12/1999 |
| JP | 2992517 B1 | 12/1999 |
| JP | 2005-330185 A | 12/2005 |
| JP | 2010-59159 A | 3/2010 |
| JP | 2013-523756 A | 6/2013 |
| JP | 2015-48447 A | 3/2015 |
| JP | 2015-48448 A | 3/2015 |
| KR | 10-2007-0036776 A | 4/2007 |
| TW | 69880 | 9/1985 |
| TW | 167606 A | 9/1991 |
| TW | I242567 B | 11/2005 |
| TW | I421281 B | 1/2014 |
| TW | 201512249 A | 4/2015 |
| TW | 201512306 A | 4/2015 |
| WO | WO 95/23148 A1 | 8/1995 |
| WO | WO 2014/084331 A | 6/2014 |
| WO | WO 2015/033936 A1 | 3/2015 |
| WO | WO 2015/033938 A1 | 3/2015 |

OTHER PUBLICATIONS

Ogawa et al., "Development of New Synthetic Procedure of Poly(phenylene sulfide)," Abstracts of the 37th Symposium on Main Group Element Chemistry, vol. 37, 2010, pp. 301-302, with an English abstract.

Tsuchida et al., "Photochemical recycling of polyarylene sulfide," Chemical Communications, No. 17, Sep. 7, 1996, pp. 2091-2092.

Tsuchida et al., "Synthesis of high molecular weight poly(phenylene sulfide) by oxidative polymerization via poly(sulfonium cation) from methyl phenyl sulfoxide," Macromolecules, vol. 26, No. 26, Dec. 20, 1993 (abstract published Nov. 15, 1993), pp. 7144-7148.

Ukai et al., "Die Reaktion der Phenolderivate mit Sulfoxiden. IV (einschlieαlich der von Sulfiden und Wasserstoffperoxid ausgehenden Reaktion). Die Synthese von 4-Thiosubstituierten-1, 2-Naphthochinonderivaten," Chem. Pharm. Bull., vol. 16, No. 4, 1968, pp. 606-612 (8 pages total), with an English abstract.

Yamamoto et al., "Aryl sulfide bond formation using the sulfoxide-acid system for synthesis of PPS via poly(sulfonium cation) as a precursor," Journal of the American Chemical Society, vol. 115, No. 13, Jun. 1993, pp. 5819-5820.

Yamamoto et al., "Oxidative Coupling of Methyl Phenyl Sulfide via Sulfonium Formation Using an Oxovanadium Complex," The Journal of Organic Chemistry, vol. 61, No. 6, Mar. 22, 1996, pp. 1912-1913.

Yamamoto et al., "Synthesis of poly(sulfonium cation) by oxidative polymerization of aryl alkyl sulfides," The Journal of Organic Chemistry, vol. 60, No. 2, 1995, pp. 452-453.

Extended European Search Report issued in European Application No. 17150823.7, dated Apr. 18, 2017.

Extended European Search Report issued in European Application No. 17150883.1, dated Apr. 10, 2017.

Tsuchida et al., "Synthesis of Poly(phenylene sulfide) by a Oxidative Polymerization of Methyl Phenyl Sulfide," Macromolecules, vol. 27, No. 4, Feb. 14, 1994 pp. 1057-1060.

Taiwanese Office Action and Search Report for Taiwanese Application No. 105142423, dated Apr. 13, 2017.

Haryono et al., "Synthesis and Nucleophilic Dealkylation of Poly[alkyl-(4-(phenylthio)phenyl)sulfonium trifluoromethanesulfonate]s," Macromolecules, vol. 31, No. 4, 1998 (Published on web Jan. 31, 1998), pp. 1202-1207.

Ho et al., U.S. Appl. No. 15/381,684, filed Dec. 16, 2016.
Ho et al., U.S. Appl. No. 15/388,215, filed Dec. 22, 2016.
Ho et al., U.S. Appl. No. 15/389,711, filed Dec. 23, 2016.
Ho et al., U.S. Appl. No. 15/389,785, filed Dec. 23, 2016.

Miyatake et al., "Polymerization of Methyl Phenyl Sulfoxide under Acidic Conditions: Synthesis and X-ray Structure Analysis of a Phenylene Sulfonium Polymer," Macromolecules, vol. 34, No. 5, 2001 (Published on web Feb. 1, 2001), pp. 1172-1179.

Miyatake et al., "Synthesis and Proton Conductivity of Highly Sulfonated Poly(thiophenylene)," Macromolecules, vol. 30, No. 10, 1997 (Abstract published in advance Apr. 15, 1997), pp. 2941-2946.

Tsuchida et al., "First Phenylene Polymers Linked by Sulfonium Groups," Angew. Chem. Int. Ed. Engl., vol. 35, No. 23/24, 1996, pp. 2843-2845.

Yamamoto et al., "Sulfide Bond Formation for the Synthesis of Poly(thioarylene) through Oxidation of Sulfur Chloride with Aromatics," Macromolecules, vol. 27, No. 15, 1994 (Abstract published in advance Jun. 15, 1994), pp. 4312-4317.

Taiwanese Office Action and Search Report issued in Taiwanese Application No. 105143834 dated Sep. 6, 2017.

U.S. Office Action for U.S. Appl. No. 15/389,785 dated Sep. 29, 2017.

European Search Report for Appl. No. 17150788.2 dated Apr. 21, 2017.

Taiwanese Office Action and Search Report dated Jul. 3, 2017 for Application No. 105143831.

Taiwanese Office Action and Search Report issued in Taiwanese Application No. 105142207 dated Dec. 19, 2017.

Goethals, E., et al, "Reactions du Sulfoxyde de Dimethyle," Bull. Soc. Chim. Belg., 1964, vol. 73, pp. 546-559.

Japanese Office Action for Appl. No. 2017-002111 dated Feb. 27, 2018 (w/ English translation).

Japanese Office Action for Appl. No. 2017-002113 dated Mar. 13, 2018 (w/ English translation).

Chinese Office Action for Appl. No. 201710013837.3 dated Apr. 16, 2018.

Chinese Office Action for Appl. No. 201710017862.9 dated May 28, 2018.

Ding, Y., et al, "Preparation of Poly(thioarylene)s from Cyclic Disulfide Oligomers," Macromolecules, May 5, 1997, vol. 30, No. 9, pp. 2527-2531.

Japanese Office Action for Appl. No. 2017-002112 dated Jul. 3, 2018.

Schultz, H.S., et al, "New Catalysts for the Oxidation of Sulfides to Sulfones with Hydrogen Peroxide," Journal of Organic Chemistry, Apr. 30, 1963, vol. 28, pp. 1140-1142.

Chinese Office Action for Appl. No. 201710017863.3 dated Oct. 12, 2018.

Chinese Office Action and Search Report for Chinese Application No. 201710013836.9, dated Sep. 18, 2018.

Chinese Office Action and Search Report for Chinese Application No. 201710017862.9, dated Jan. 3, 2019.

Liang et al., "Advanced organic chemistry, Structure, Reaction, Synthesis," Higher Education Press, Nov. 30, 1993, pp. 341-344 (7 pages total), see reaction at p. 343.

* cited by examiner

POLYMER

CROSS REFERENCE TO RELATED APPLICATIONS

This application claims the benefit of U.S. Provisional Application No. 62/277,091, filed on Jan. 11, 2016, which is incorporated herein by reference.

The application is based on, and claims priority from, Taiwan Application Serial Number 105142916, filed on Dec. 23, 2016, the disclosure of which is hereby incorporated by reference herein in its entirety.

TECHNICAL FIELD

The disclosure relates to a polymer, and in particular to a polyarylene sulfide (PAS) or a salt thereof.

BACKGROUND

Polyarylene sulfide (PAS) is a material with good physical characteristics such as thermal resistance, chemical resistance, flame resistance, and electrical insulation characteristics. Thus, polyarylene sulfide (PAS) can be used in computer accessories and auto accessories; as a coating for parts that come into contact with corrosive chemicals; and as industrial fibers having chemical resistance.

One conventional method for producing polyarylene sulfide (PAS) is the halogen-containing process that, in principle, results in a low yield of polyarylene sulfide (PAS) and produces unrecyclable halogen-containing byproducts that can cause environmental pollution. In addition, conventional polyarylene sulfides (PAS) with two different repeating units are generally arranged in a random fashion, so that the thermal resistance, chemical resistance, flame resistance, and electrical insulation characteristics of the conventional polyarylene sulfides cannot be enhanced.

SUMMARY

According to embodiments of the disclosure, the disclosure provides a polymer having a repeating unit having a structure represented by Formula (I) or Formula (II):

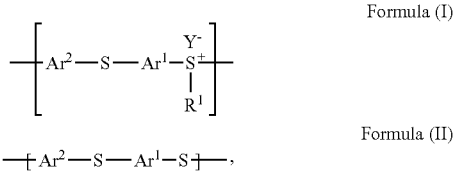

wherein $Ar^1$ and $Ar^2$ can be independently substituted or unsubstituted aryl diradical; $Y^-$ can be $R^2SO_3^-$ or $ClO_4^-$; $R^1$ can be $C_{1-6}$ alkyl group; $Ar^1$ and $Ar^2$ are different; and, $R^2$ can be $C_{1-6}$ alkyl group, substituted or unsubstituted aromatic ring, or $C_{1-6}$ haloalkyl group.

A detailed description is given in the following embodiments with reference to the accompanying drawings.

DETAILED DESCRIPTION

Embodiments of the disclosure provide a polymer, such as polyarylene sulfide (PAS) or a salt thereof. According to embodiments of the disclosure, the main chain of the polymer of the disclosure consists of different aryl groups alternately arranged. Therefore, the polymer of the disclosure exhibits relatively high crystallinity and melting point (such as larger than or equal to about 330° C.). Moreover, the thermal resistance, chemical resistance, flame resistance, and electrical insulation characteristics of the polymer are improved.

According to embodiments of the disclosure, the polymer of the disclosure can have a repeating unit having a structure represented by Formula (I) or Formula (II):

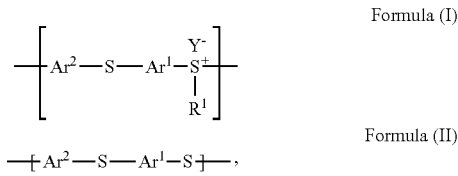

wherein $Ar^1$ and $Ar^2$ can be independently substituted or unsubstituted aryl diradical; $Y^-$ can be $R^2SO_3^-$ or $ClO_4^-$; $R^1$ can be $C_{1-6}$ alkyl group; $Ar^1$ and $Ar^2$ are different; and $R^2$ can be $C_{1-6}$ alkyl group, substituted or unsubstituted aromatic ring, or $C_{1-6}$ haloalkyl group. Herein, the substituted aryl diradical of the disclosure means that at least one hydrogen atom bonded to carbon atoms of the aryl diradical can be replaced with $C_{1-6}$ alkyl group. According to embodiments of the disclosure, the substituted aromatic ring means that at least one hydrogen atom bonded to carbon atoms of the aromatic ring can be replaced with $C_{1-6}$ alkyl group.

According to embodiments of the disclosure, $Ar^1$ and $Ar^2$ can be independently substituted or unsubstituted phenylene, biphenylene, naphthylene, thienylene, indolylene, phenanthrenylene, indenylene, anthracenylene, or fluorenylene, wherein the substituted phenylene, substituted biphenylene, substituted naphthylene, substituted thienylene, substituted indolylene, substituted phenanthrenylene, substituted indenylene, substituted anthracenylene, or substituted fluorenylene mean that the substituted aryl diradical of the disclosure means that at least one hydrogen atom bonded to carbon atoms of the aryl diradical can be replaced with C1-6 alkyl group.

According to embodiments of the disclosure, $C_{1-6}$ alkyl group of the disclosure can be a linear or branched $C_{1-6}$ alkyl group. For example, $R^1$ can be methyl, ethyl, propyl, isopropyl, n-butyl, t-butyl, sec-butyl, isobutyl, pentyl, or hexyl.

According to embodiments of the disclosure, $Ar^1$ and $Ar^2$ can be independently

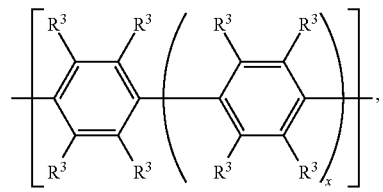

x can be 0, 1, or 2; $R^3$ can be independently hydrogen, or $C_{1-6}$ alkyl group. For example, $R^3$ can be independently hydrogen, methyl, ethyl, propyl, isopropyl, n-butyl, t-butyl, sec-butyl, isobutyl, pentyl, or hexyl.

According to embodiments of the disclosure, the repeating unit having a structure represented by Formula (I) can be

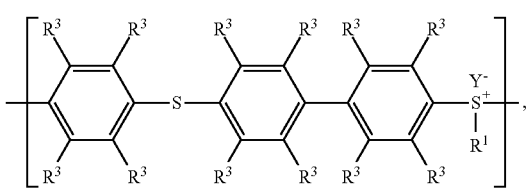

and the repeating unit having a structure represented by Formula (II) can be

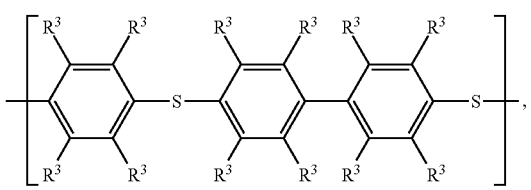

wherein $R^1$, $R^3$, and $Y^-$ have the same definition as above.

According to embodiments of the disclosure, the degree of polymerization of the polymer of the disclosure can be adjusted. For example, the polymer of the disclosure can have a number average molecular weight from about 600 to 120,000, or have a number average molecular weight from about 10,000 to 30,000.

According to embodiments of the disclosure, the method for preparing the polymer of the disclosure includes reacting a compound having a structure represented by Formula (III) with acid, obtaining a polymer with a repeating unit having a structure represented by Formula (I):

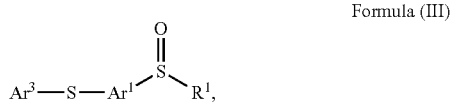

Formula (III)

wherein $Ar^1$ can be substituted or unsubstituted aryl diradical, such as substituted or unsubstituted phenylene, biphenylene, naphthylene, thienylene, indolylene, phenanthrenylene, indenylene, anthracenylene, or fluorenylene; $Ar^3$ can be substituted or unsubstituted aryl group, such as substituted or unsubstituted phenyl group, biphenyl group, naphthyl group, thienyl group, indolyl group, phenanthrenyl group, indenyl group, anthracenyl group, or fluorenylene group. The substituted aryl group means that at least one hydrogen atom bonded to carbon atoms of the aryl group can be replaced with $C_{1-6}$ alkyl group. $Ar^1$ and $Ar^3$ can be derived from different compounds. For example, when $Ar^1$ is phenylene, $Ar^3$ is not phenyl group. The aforementioned acid can be sulfuric acid, methanesulfonic acid, benzenesulfonic acid, p-toluenesulfonic acid, or trifluoromethanesulfonic acid. The acid can react with the compound having a structure represented by Formula (III). In addition, the excessive acid can also serve as the reaction solvent.

Furthermore, the anionic ion ($Y^-$) of the polymer with a repeating unit having a structure represented by Formula (I) can be further replaced with other anionic ion (such as $CH_3SO_3^-$), obtaining a polymer with other anionic ion.

Moreover, the polymer with a repeating unit having a structure represented by Formula (I) can be further reacted with a nucleophile to undergo a dealkylation, obtaining polymer with a repeating unit having a structure represented by Formula (II). According to embodiments of the disclosure, the nucleophile can be metal halide, metal hydroxide, alcohol, amine (such as secondary amine or tertiary amine), or thiol. For example, the nucleophile can be sodium chloride, potassium chloride, aluminum chloride, or 4-methylpyridine.

The inventive concept of the disclosure may be embodied in various forms without being limited to the exemplary embodiments set forth herein.

Example 1

0.7 g of methyl phenyl sulfoxide and 1 g of methyl biphenyl sulfide were added into a reaction bottle under a nitrogen atmosphere, and then cooled to 0° C. Next, 10 ml of methanesulfonic acid was added slowly into the reaction bottle, and then stirred for 30 min. After raising the temperature back to room temperature, the mixture was stirred for 20 hr. Next, the result was poured into 40 ml of perchloric acid, and then stirred for 1 hr. Next, the mixture was extracted three times using 50 ml of dichloromethane and 100 ml of water as the extraction solvent, and then the organic phase was collected. After drying, filtering and concentrating the organic phase, Compound (1), with a yield of about 92%, was obtained. The synthesis pathway of the above reaction was as follows:

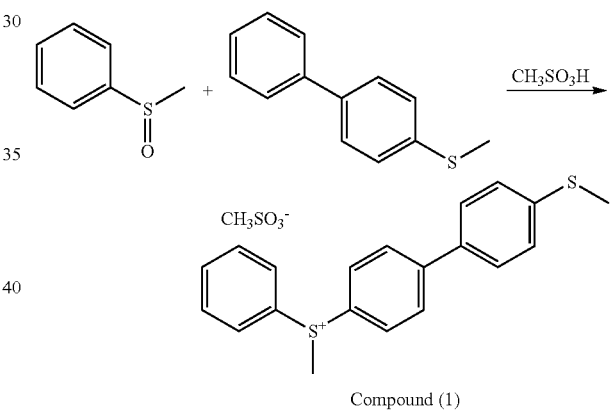

Compound (1)

Compound (1) was analyzed by nuclear magnetic resonance (NMR) spectroscopy and the result is as follows: $^1$H NMR (400 MHz, ppm, $CDCl_3$): 2.48 (—$CH_3$, s), 3.67 (sulfonium-$CH_3$, s), 7.40-7.94 (aromatic H, 13H, m). Furthermore, Compound (1) was analyzed by liquid chromatography-mass spectrometry (LC-MS) and the result is as follows: m/z=323 (excluding anionic ion $CH_3SO_3^-$).

Next, 1.9 g of Compound (1) and 30 ml of acetic acid were added into a reaction bottle under a nitrogen atmosphere. After stirring for several minutes, 2.02 ml of hydrogen peroxide was added slowly into the reaction bottle. After stirring for 90 min, the result was extracted three times using 50 ml of dichloromethane and 100 ml of water as the extraction solvent, and then the organic phase was collected. After drying, filtering and concentrating the organic phase, Compound (2) (orange), with a yield of about 92%, was obtained. Next, 10 ml of 4-methylpyridine and Compound (2) were added into a reaction bottle under a nitrogen atmosphere, and then stirred for 30 min. After heating to reflux for 20 min, Compound (3) was obtained. The synthesis pathway of the above reaction was as follows:

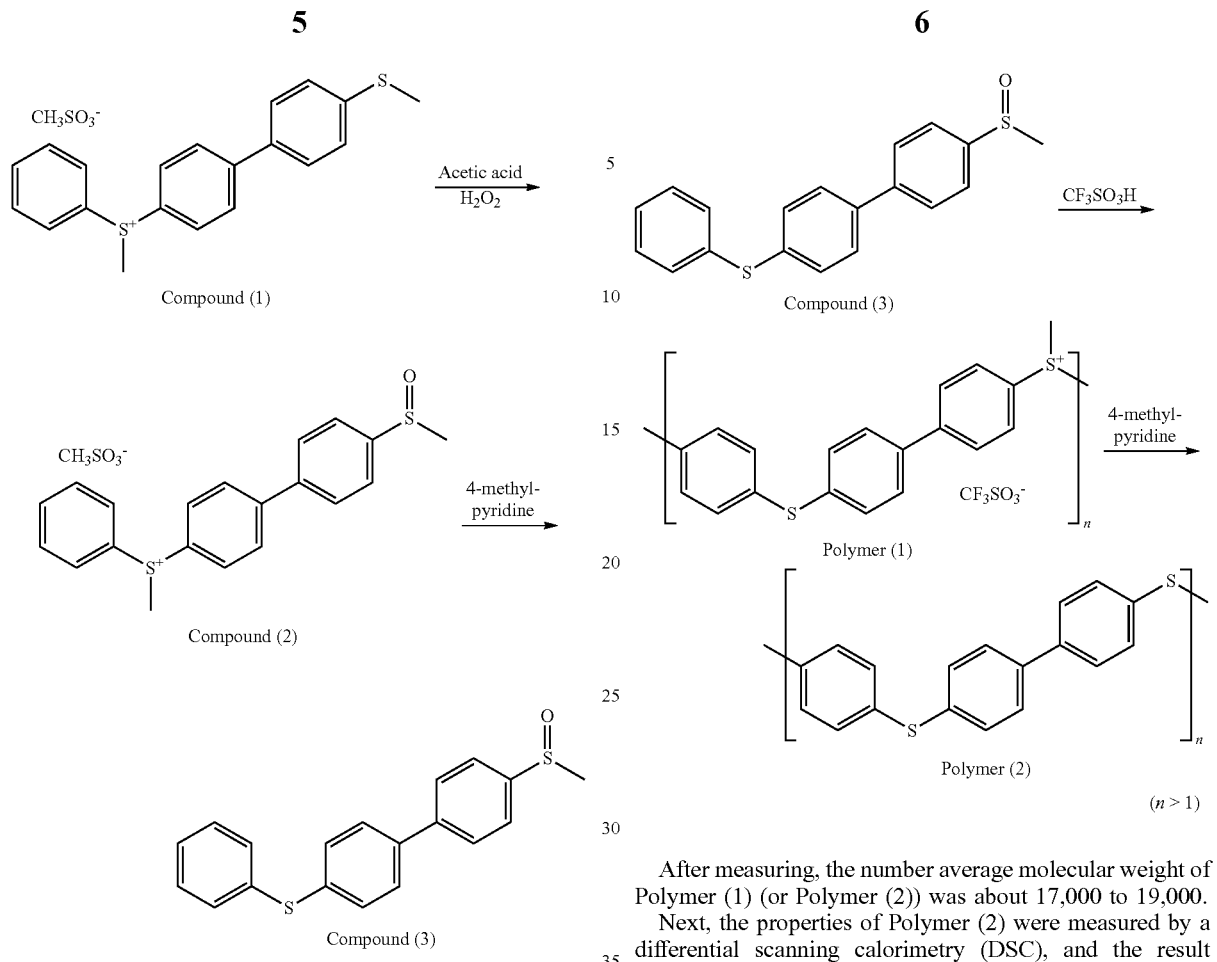

Compound (3) was analyzed by nuclear magnetic resonance (NMR) spectroscopy and the result is as follows: $^1$H NMR (400 MHz, ppm, CDCl$_3$): 2.72 (—CH$_3$, s), 7.38-7.63 (aromatic H, 13H, m). Furthermore, Compound (3) was analyzed by liquid chromatography-mass spectrometry (LC-MS) and the result is as follows: m/z=325 (M+H$^+$), 347 (M+Na$^+$), and 671 (2*M+Na$^+$) (M represents molecular weight).

Next, 1 g of Compound (3) was added into a reaction bottle under a nitrogen atmosphere, and then cooled to 0° C. Next, 15 ml of trifluoromethanesulfonic acid was added slowly into the reaction bottle, and then stirred for 2 min. After raising the temperature back to about 18° C., the result was poured into deionized water at 0° C., and a white precipitate was formed. Next, the white precipitate was collected and washed with deionized water several times until the white precipitate was substantially neutral. After drying the white precipitate by vacuum drying for 6 hr, Polymer (1), with a yield of about 100%, was obtained. Next, 1 g of Polymer (1) was added into a reaction bottle under a nitrogen atmosphere, and then 10 ml of 4-methyl-pyridine was slowly added into the reaction bottle. After stirring at room temperature for 30 min, the reaction bottle was heated to reflux at 150° C. After stirring for 5 hr, the reaction bottle was cooled to room temperature, and then the result was poured into 200 ml of methanol (containing 10% HCl), and a white precipitate was formed. Next, the white precipitate was collected, obtaining Polymer (2), with a yield of about 98%. The synthesis pathway of the above reaction was as follows:

After measuring, the number average molecular weight of Polymer (1) (or Polymer (2)) was about 17,000 to 19,000.

Next, the properties of Polymer (2) were measured by a differential scanning calorimetry (DSC), and the result shows that Polymer (2) has a melting temperature (Tm) of about 330° C. and a recrystallization temperature on cooling (Tcc) of about 251° C. Next, Polymer (2) was analyzed by Fourier-transform infrared (FT-IR) spectroscopy, and the result shows that the strong absorption peaks are 3023, 1593, 1472, 1388, 1090, 1006, 808 (cm$^{-1}$).

Accordingly, since the main chain of the polymer of the disclosure (such as polyarylene sulfide (PAS) or a salt thereof) consists of different aryl groups alternately arranged, the polymer of the disclosure exhibits relatively high crystallinity and melting point (such as larger than or equal to about 330° C.). Moreover, the thermal resistance, chemical resistance, and flame resistance of the polymer are improved.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A polymer, which has a repeating unit having a structure represented by Formula (I)

Formula (I)

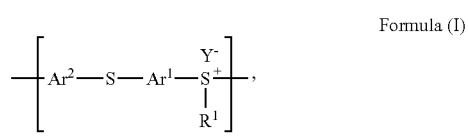

wherein

Ar$^1$ and Ar$^2$ are independently

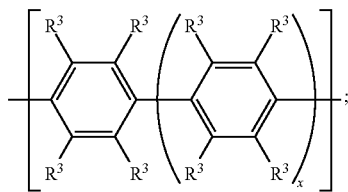

R$^3$ is independently hydrogen, or C$_{1-6}$ alkyl group; x is 0, 1, or 2 provided that x of Ar$^2$ is not 0 when x of Ar$^1$ is 0;

Y$^-$ is R$^2$SO$_3^-$ or ClO$_4^-$;

R$^1$ is C$_{1-6}$ alkyl group;

Ar$^1$ and Ar$^2$ are different; and,

R$^2$ is C$_{1-6}$ alkyl group, substituted or unsubstituted aromatic ring, or C$_{1-6}$ haloalkyl.

2. The polymer as claimed in claim 1, wherein R$^1$ is methyl, ethyl, propyl, isopropyl, n-butyl, t-butyl, sec-butyl, isobutyl, pentyl, or hexyl.

3. The polymer as claimed in claim 1, wherein R$^3$ is independently hydrogen, methyl, ethyl, propyl, isopropyl, n-butyl, t-butyl, sec-butyl, isobutyl, pentyl, or hexyl.

4. The polymer as claimed in claim 1, wherein the repeating unit having a structure represented by Formula (I) is

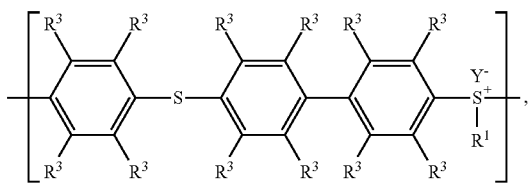

wherein R$^1$ is C$_{1-6}$ alkyl group; R$^3$ is independently hydrogen, or C$_{1-6}$ alkyl group; and, Y$^-$ is R$^2$SO$_3^-$ or ClO$_4^-$.

* * * * *